Figure 1:
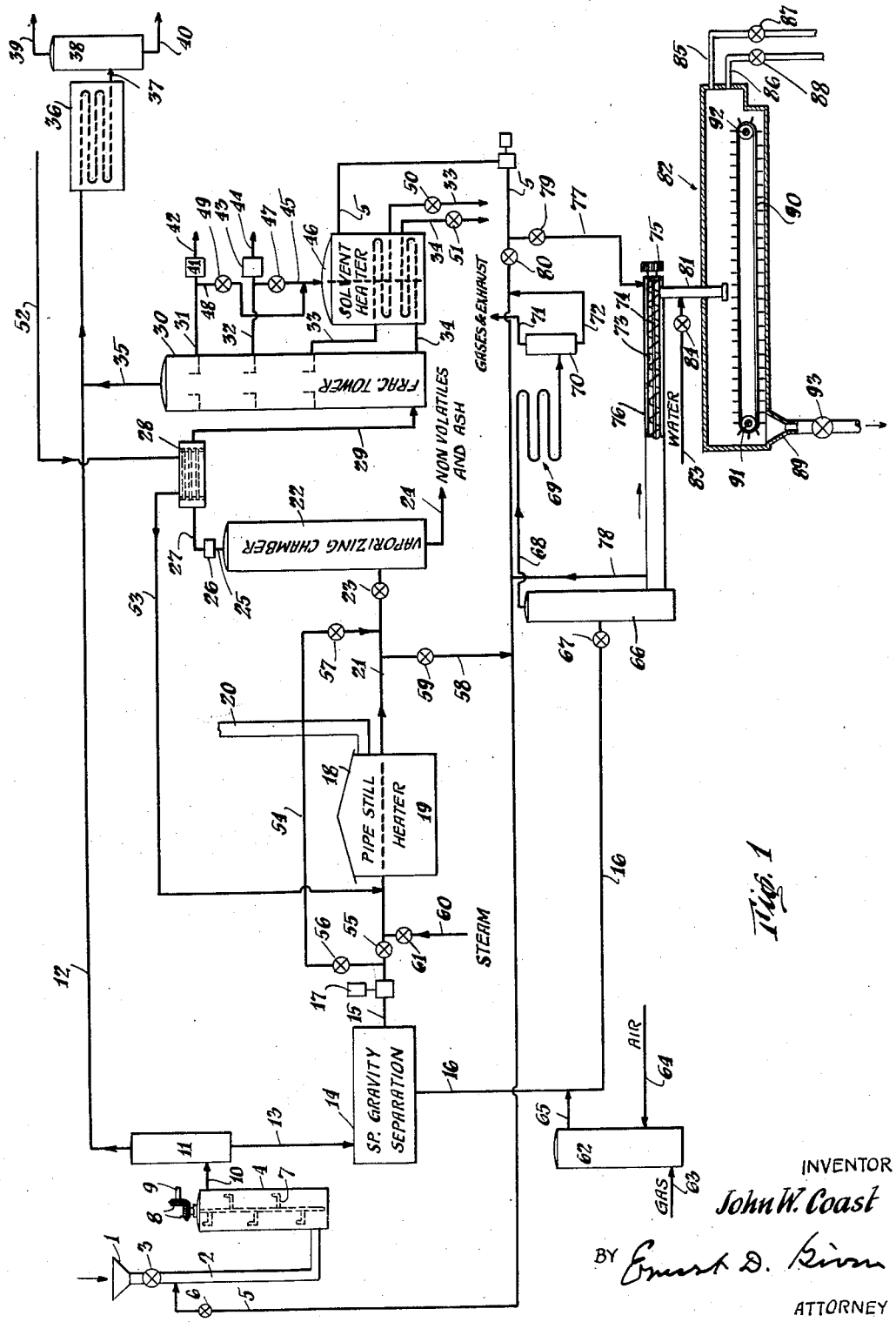

Nov. 29, 1949      J. W. COAST      2,489,700
RECOVERY OF VALUES FROM ROCK ASPHALT AND LIKE MATERIAL
Filed July 20, 1946      2 Sheets-Sheet 1

INVENTOR
John W. Coast
BY
ATTORNEY

Nov. 29, 1949     J. W. COAST     2,489,700
RECOVERY OF VALUES FROM ROCK ASPHALT AND LIKE MATERIAL
Filed July 20, 1946     2 Sheets-Sheet 2

INVENTOR
*John W. Coast*
BY *Ernest D. Givan*
ATTORNEY

Patented Nov. 29, 1949

2,489,700

UNITED STATES PATENT OFFICE 2,489,700

RECOVERY OF VALUES FROM ROCK ASPHALT AND LIKE MATERIAL

John W. Coast, Dallas, Tex., assignor of one-half to Clarence H. Dragert, Dallas, Tex.

Application July 20, 1946, Serial No. 685,066 In Cuba August 4, 1945

1 Claim. (Cl. 196—14)

The present invention relates to the treating and refining of rock asphalt, oil shales and like material to recover valuable petroleum products therefrom and more particularly to a process for accomplishing these purposes.

Material of this kind includes not only bituminous or hydrocarbon material, which is water-insoluble and oil-soluble and is of an organic nature, but also earthy, clay or sand type materials and/or volcanic ash, which are both water and oil-insoluble and are of an inorganic nature. The problem of treating such material to recover the valuable constituents thereof involves two basic elements, first, the separation of the hydrocarbon or organic materials from the earthy or inorganic materials, and second, the separation of the hydrocarbon materials into selected usable valuable fractions or portions. The present application includes solutions to both these problems in such a way that the solution of each is made to assist in various respects the solution of the other. The provision of a practical commercial solution of these two problems jointly is a principal general object of the present invention.

A further object of the present invention is to provide a process for the separation of the inorganic materials from the organic materials in the treatment of raw material of this nature, primarily by dissolving the oil-soluble organic materials in a solvent oil, which is produced in a later stage of the process, then effecting a substantial separation of the solution of the organic materials in the solvent oil from the inorganic materials by any one or more of several practical methods, principally involving a separation based upon specific gravity difference.

A further object of the present invention is to provide for the treatment of the liquid portion, separated by the specific gravity difference as aforesaid, in such a way as to separate therefrom any remaining inorganic material, which may not have been completely separated therefrom by the specific gravity separation aforesaid.

Further objects include the further treatment of this liquid solution of hydrocarbon materials in oil to separate it into selected usable fractions, preferably by evaporation and subsequent fractional condensation, and the use of at least a portion of one of such fractions as a further supply of solvent oil, the process preferably being continuous in character and having the advantages of known commercial oil refining processes in this respect. A further specific object in this connection is to use such solvent as such, while retaining therein a maximum amount of the sensible heat contained by this material when it is separated as aforesaid from other fractions.

A further object of the invention is to provide a process and apparatus for the treatment of the portion including a major part, preferably at least 90%, of the inorganic material and which is separated from the liquid portion by the specific gravity separation as aforesaid, so as to recover from this portion, a maximum amount, preferably substantially all, of the hydrocarbon materials which may be included with the inorganic materials in the portion resulting from the specific gravity separation. More specific objects in this respect are to effect this separation of the relatively small amount of organic materials from the relatively large amount of inorganic materials by processes including a vaporization separation of the organic materials, the admixture of a large amount of water and subsequent decantation, or both.

A further object of the present invention as adapted to a commercially practicable apparatus for accomplishing the objects, generally set forth above, is to provide for suitable heat recovery and temperature control at any and all parts of the apparatus for the entire process where the saving of heat may be advantageously effected, so as to economize in the use of fuel and to produce the final products for a minimum cost of the operation of the process and thus for a minimum cost per unit of the final products.

A further object of the present invention is to combine a process as hereinabove set forth with conventional cracking, so that the process may be operated to produce, among other fractions, a cracking stock, which may be the same as that used as a major part at least of the solvent for return to the dissolving step of the process. This stock may thereafter be subjected to any selected conventional cracking process as hereinafter set forth for the recovery therefrom of desired cracked petroleum products, particularly high octane gasoline.

Figure 2:
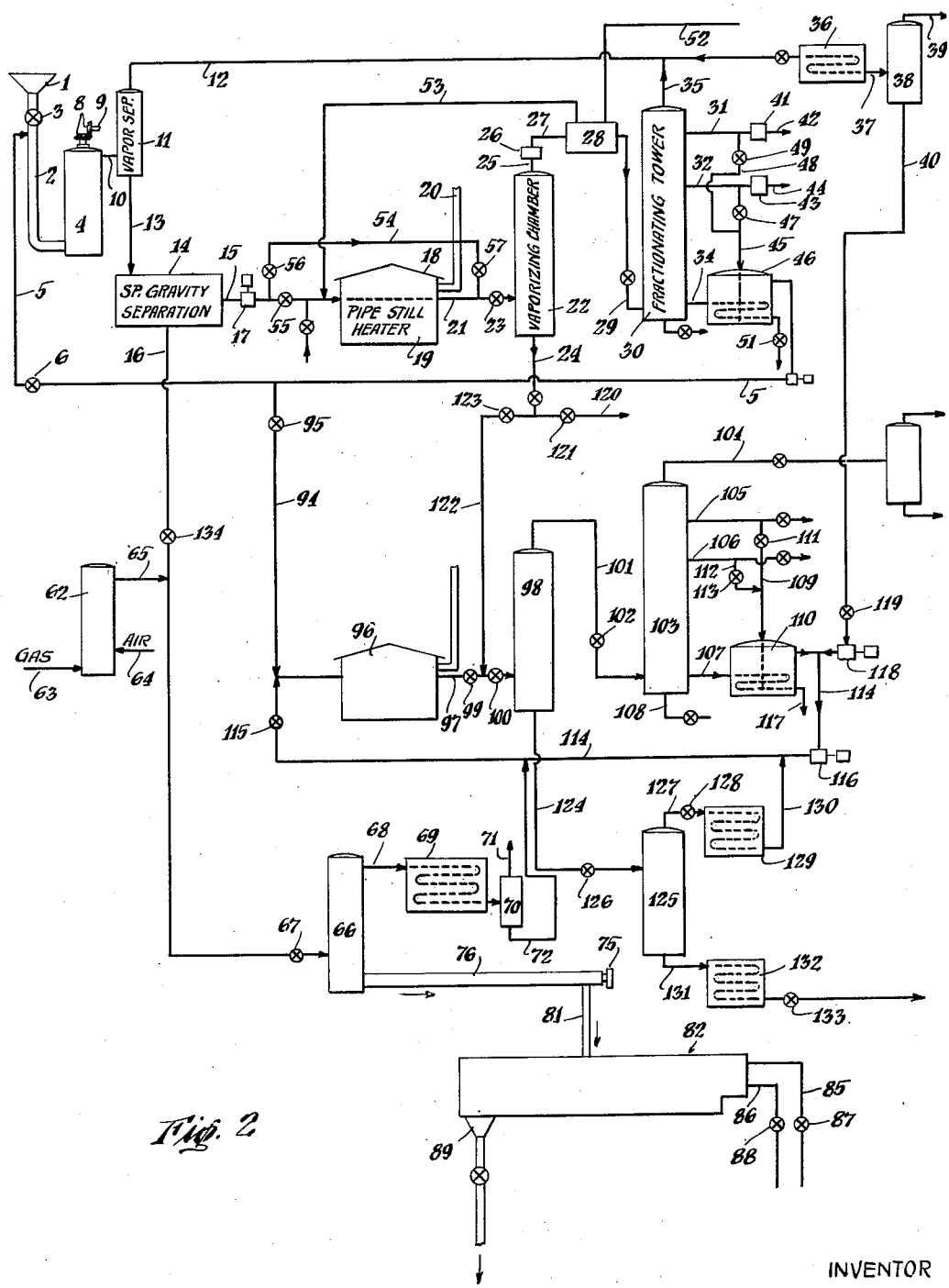

Further and more detailed objects of the present invention will become apparent from the following description and appended claims when taken in connection with the accompanying drawings, in which Figure 1 illustrates in diagrammatic form apparatus for carrying out the present invention in accordance with the novel process hereinafter set forth in detail; and Fig. 2 is a diagrammatic illustration showing the process of Fig. 1 as modified by the inclusion therein of conventional cracking steps and apparatus.

The present application relates particularly to a process and apparatus for treating a type of rock asphalt which has been found to exist in substantial quantities in Cuba and which is over 50% bituminous hydrocarbon material, the balance being a fine volcanic ash, which is relatively difficult to separate from the hydrocarbon material due to the small size of the particles. It is desired that the separation be effected in a liquid or substantially liquid phase in accordance with the present invention by first dissolving the soluble portions, that is the hydrocarbon materials, in a solvent oil, which is produced as one of the products at a later stage of the process. It is preferred, in accordance with the present invention, to use as a solvent oil a large percentage, if not all, of a hydrocarbon fraction known in the art as "gas oil," rather than to use the lightest boiling fraction, such as gasoline or naphtha due to the volatile character of the latter, and then also to use such high temperatures in order to reduce the viscosity of the solution including the inorganic ash or earthy material as will permit an effective separation. Following this separation, the liquid fraction is passed through a "topping" or evaporation and fractional condensation apparatus, although it may be necessary, as an intermediate step on this fraction, first to separate any residual inorganic material therefrom. The other fraction including most of the solids, is preferably passed through one or more suitable processes for the recovery of such hydrocarbon materials as are still contained therein, which is principally solvent oil.

The first step of the process is to get the soluble portions of the raw material into solution in the solvent oil. In effecting this step of the process, it is contemplated that the material may be first comminuted and then the soluble portions thereof dissolved, or the comminuting and dissolving steps may be effected simultaneously, the net purpose and result to be desired being a solution of all the soluble portions, the inorganic material remaining in suspension in the solution.

Turning now to the accompanying drawings, raw material as aforesaid may be supplied from a comminuting apparatus (not shown) to a hopper 1 at the upper end of a standpipe or other equivalent apparatus 2, a suitable valve 3 being provided for controlling the rate of feed of comminuted material from the hopper into the standpipe. The material thence moves, preferably by gravity, into a mixing chamber 4. Prior to this, however, solvent oil may be supplied through a line 5 under control of a suitable valve 6 therein to some suitable step or place in the process or apparatus at which the solution is to be initiated, here shown as the upper portion of the standpipe 2. In accordance with the present invention, I prefer that the material to be treated be ground to about 30 to 40 mesh prior to mixing it with the solvent oil. The mixing chamber 4 may be provided with suitable agitating means here shown as a mechanical stirrer 7 and actuated through suitable gearing 8 from a power shaft 9 which may be driven in any suitable manner (not shown). I contemplate, however, that other mixing means such as one or more circulating pumps may be used in addition to or in substitution for the means shown. Thus by the time the material is ready to leave the mixing chamber 4, substantially all the soluble portions thereof will have been dissolved in the solvent oil. Further, in order to effect rapid and complete solution as aforesaid, it is desired that the solvent oil be supplied and maintained at a fairly high temperature, which is preferably in the order of magnitude of about 250° to about 450° F., and more specifically and preferably, is about 350° F. This temperature will be selected, so as to be high enough to maintain the viscosity of the solution and its contained solid particles down to a desired working range, yet below the evaporation point of most, if not all, of the constituents of the solvent oil, as it is not desired at this point in the process to produce any substantial amount of vapor in accordance with the present invention.

Material passes from a suitable point in the mixing chamber 4 through a line 10 to a vapor separating chamber 11 from the top of which a vapor line 12 passes to a suitable portion of the apparatus later to be described. From the lower end of the separation chamber 11, the liquid and suspended solid matter passes through a line 13 to the next step of the process.

This step of the process is that of effecting a separation between the now liquid material in solution in the solvent oil and the solid or inorganic material mixed therewith. While it is contemplated that this separation might be effected by filtration, using any known or suitable filtering apparatus, such processes are usually somewhat slow, require a great deal of apparatus and tend to be intermittent in nature rather than continuous. For this reason it is not desired, in accordance with the present invention, to employ a filtration separation. The present invention contemplates separation by specific gravity difference between the solid inorganic matter of relatively high specific gravity and the liquid organic matter dissolved in the solvent oil, all of which has a relatively low specific gravity.

There are three basically different types of apparatus by which this specific gravity separation may be effected. It is contemplated in accordance with the present invention, that any one or more of these types of apparatus may be used. The first type is the simple settling tanks, which are well known in the art and which may be provided in sufficient number and capacity so as to effect a desired separation of practically all the solid material with some solvent oil remaining therein from practically all the liquid material which may still have some fine particles of inorganic material therein. In order to handle substantial quantities of material, such as are required for commercial operation, and to be able to operate the rest of the process as herein described in a substantially continuous manner, a relatively large number and capacity of settling tanks would be required. Thus while it is contemplated that this type of equipment may be used, it is not the preferred form in accordance with the present invention. The results, however, may be equally as efficient from the point of view of completeness of separation from those obtained from any other process, so that the use of this type of equipment is contemplated as feasible and completely operative in accordance with the present teachings.

The second type of equipment which may be used commercially to effect the desired specific gravity separation involves the use of devices known as classifiers or clarifiers, such, for example, as those made by the Dorr Company, which are well known in the art. These devices are quite efficient in operation and are completely satisfactory from the point of view of carrying out the present process as far as the degree of separation is concerned. They are not the preferred form, however, for two reasons, first that the devices are quite expensive as to initial cost and also they require a more dilute solution to be used; that is, the ratio of solvent oil to the original material must be at least 2:1 in order that they may operate efficiently. This high ratio of solvent oil requires the re-circulation through the system of substantially larger quantities of solvent oil than the third type of apparatus, hereinafter to be described, wherein a 1:1 ratio may be used, and thus increases the cost of the entire installation by reason of the requirement for larger equipment throughout for handling the larger amount of solvent oil, which must be re-circulated in the process.

The third and preferred type of apparatus for use in effecting this specific gravity separation are centrifugal devices, preferably of a continuous type. Such devices are now commercially available, so that the detailed construction of the devices per se forms no part of the present invention. They will operate, however, upon a mixture as hereinabove set forth, wherein a 1:1 ratio of solvent oil to the original material is used, considered from the point of view of the application of the present process to rock asphalt, such as is now obtainable in Cuba. They operate continuously, so as to fit in admirably with the rest of the process, which is of a continuous type; and they effect better than a 90%, usually about 95% or slightly better, separation of the solid particles from the solution. The processes and apparatus for the separation of the remaining solid particles from the solution and for the separation of solvent and dissolved material from the major portion of the solid material will be set forth thereinafter.

In the accompanying drawings, there is illustrated at 14 in block form only, apparatus, which may be any one of the three types hereinabove set forth, by which the major portion of the solution is separated from the major portion of the solid material, the solution passing therefrom through a line 15 and the solid material passing therefrom through a line 16. A suitable pump apparatus 17 may be interposed as shown in the line 16. It will be understood, of course, that the line 13 is used to supply material to the specific gravity separation apparatus. During this specific gravity separation, it is necessary that the viscosity of the solution be kept down to a desired point. For this reason, the temperature of the material is of the essence, so that this temperature must be maintained sufficiently high to permit the efficient separation as aforesaid. It is contemplated that temperatures as above set forth having extreme limits of about 250° to about 450° F. and a preferable temperature of about 350° F., will be employed at this stage of the process.

*Treatment of the liquid portion resulting from specific gravity separation*

The separated liquid portion resulting from the specific gravity separation and which may include a small amount, not over 10%, of the non-combustible or inorganic material initially present, passes through the line 15 to and through a heating device shown as a pipe still heater and indicated generally at 18. Here the temperature of the materials are raised up to the evaporation point of substantially all the hydrocarbon materials present. It is contemplated that this temperature will be in the order of magnitude of about 775° to about 950° F. and preferably about 850° F. The pipe still heater 18 may be heated by the combustion of any suitable fuel or from any other source of heat available. As shown, it includes a portion 19 intended to designate a fire box, in which the fuel may be burned in a manner not specifically illustrated. A suitable stack for the exhaust of products of combustion is illustrated at 20. The separated liquid material leaves the pipe still heater 18 through a line 21 and thence passes to a vaporizing chamber 22, a suitable valve 23 being interposed in this line to control the flow therethrough and preferably to restrict the vaporization to a substantial extent at least to the chamber 22 rather than to permit vaporization within the pipe still heater or the line 21. In the chamber 22 substantially all the volatile constituents of the material supplied thereto will be vaporized.

Some non-volatile hydrocarbon material may remain along with the major portion at least of the inorganic non-volatiles, which may pass out of the bottom portion of the vaporizer through a suitable passage indicated as a line 24. In the event that this material contains a substantial amount of tar or pitch, the material may be usable as a road building material, either alone or by admixture with other suitable materials. This material may also be usable for other purposes which will not be specifically disclosed as they form per se no part of the present invention. In any event this non-volatile material is one of the final products of the process as herein disclosed.

The vapor passes from the vaporizing chamber 22, through a line 25, in which may be interposed a device 26 for separating any solid particles from the vapor or gas. This device may be of the electrical separator type such as the well known Cottrell separator. The solid materials from this separation may then be disposed of in any suitable manner, not illustrated. Gaseous products from this separation pass thence through a line 27 and a heat interchanger generally indicated at 28, wherein they are cooled to some extent and the heat recovered as hereinafter set forth and then passed through a line 29, which may have a suitable valve therein as shown, to a fractionating tower generally indicated at 30. This tower may be of the well known bubble type and serves for the fractional condensation of the constituents of the vapor supplied thereto. As shown there are four normally liquid fractions removed from the fractionating tower 30, although this number may be greater or less as desired and the fractions may be selected as to any desired limits as is now well known in the art. The four fractions here illustrated may be, starting from the top, a line 31 for naphtha and gasoline, a line 32 for gas oil which may also be used in part as a cracking stock as hereinafter set forth, a line 33 for fuel oil and a line 34 for pitch. The permanently gaseous materials and any other material entrained and carried along thereby and which is not condensed in the fractionating tower 30, passes through a line 35 from the upper portion thereof.

The line 35 joins the line 12 above described and then may pass to and through a condenser 36 in which the temperature of the materials is reduced preferably substantially to room temperature and any condensible gases may be separated from the permanent gases. For this purpose the materials flowing from the condenser 36 pass through a line 37 through a vapor separator 38 from which permanent gases may pass through a line 39 and condensed or liquid products through a line 40. The liquid products in the line 40 will include the lighter naphthas and lighter straight run gasoline fractions. The permanent gases from the line 39 may pass through suitable gas scrubbing devices (not shown) for removal of selected constituents such as compounds of sulfur and then may be used for any desired purposes. These are two more of the final products from the process. The naphtha and gasoline fractions passing from the line 31 may be passed in part through a heat interchanger or cooler 41 and thence through a line 42 to a suitable collecting point, the heat recovered in the heat interchanger 41 being employed as desired in any desired part of the process of otherwise. Similarly a selected part of the gas oil fraction passing out through line 32 may pass through a heat interchanger or cooler 43 and thence through a line 44 to a suitable place where a surplus portion of this material may be stored. Thus there is obtained from the lines 42 and 44 two other final products from the process, encluding straight run gasoline and similar fractions from the line 42 and gas oil from the line 44.

A selected portion of the lighter fractions, which preferably contain a major proportion at least of gas oil, is diverted from the line 32 prior to passing through the cooling device or heat interchanger 43 interposed in this line, through a line 45, to a solvent storage and heater apparatus 46 under control of a valve 47. This serves as a source of solvent oil to be supplied to the line 5 under control of the valve 6 as aforesaid. If desired, a selected and minor proportion of the lightest fractions from the line 31 may be diverted through a line 48 under control of a valve 49 to mix with the gas oil portion diverted for use as a solvent. It is noted that both or either of these portions thus diverted for use as a solvent, are taken off from the flow of these materials from the fractionating tower to the storage point for the final products in advance of the cooling thereof, so as to retain in the diverted materials as much as possible of the sensible heat which they contain upon leaving the fractionating tower and so as to minimize the requirements of re-heating, prior to their use as a solvent, for which they are used hot as aforesaid.

The lines 33 and 34 pass through suitable heat transfer coils in the solvent heater 46 enroute to the collecting points for the materials passing through these lines as diagrammatically illustrated in the accompanying drawing. Flow through these lines is controlled by suitable valves indicated at 50 and 51, respectively. These lines conduct two more of the final products resulting from this process. However, the heat contained in these materials, which are discharged from the fractionating tower 30 at relatively higher temperatures than the temperatures at which the lower boiling fractions are discharged, is saved to a large extent at least and transmitted to the solvent oil being re-circulated in the process by the apparatus shown, thus effecting a practical saving of heat at this point.

In some instances, it may be desired to reintroduce permanently gaseous products of the reaction back into the flow of fluid, which has been traced out hereinabove, particularly for the purpose of providing a reducing gas for reaction with any sulfur which may be present in the original material, so as to sweep out this sulfur in the form of hydrogen sulfide and thereby to separate it from the other products which are separated from each other as stated. For this purpose there is shown a line 52 leading from the apparatus (not shown) wherein the permanent gases may be received and stored or otherwise treated and passing to the heat interchanger 28. In this interchanger the gases in the line 52 are brought up to a desired higher temperature and then passed through a line 53 to the line 15 in advance of the pipe still heater 18. This gaseous material may then react with the sulfur either in the pipe still heater or in the vaporizing chamber 22 or some other subsequent part of the apparatus to reduce the sulfur to hydrogen sulfide, which will be carried through the process through the paths hereinabove set forth and pass out from the fractionating tower 30 through the line 35 and thence through the heat interchanger 36, the vapor separator 38 and the line 39 and may be recovered from the gas by a suitable scrubbing operation with an absorbent liquid.

In some instances it may be desired to effect a control of the temperature of the materials enroute from the pipe still heater 18 to the vaporizing chamber 22, for example, so as to reduce the temperature of the liquid entering the vaporizing chamber. To enable this to be done, a by-pass 54 may be provided, which is connected at its entrance end to the pipe 15 between the specific gravity separation apparatus 14 and the pipe still heater 18 and at its exit to the line 21 extending between the pipe still heater and the chamber 22. The amount of material thus by-passed may be accurately controlled by control of a valve 55 in the line 15 and one or more valves as shown at 56 and 57 in the by-pass 54. It will thus be seen that by the control of the flow of a selected amount of material through the by-pass 54, the temperature of the admixed materials following the return of this by-passed material to the flow through the line 21 may be such as to control the temperature of the fluid entering the vaporizing chamber 22.

Under certain circumstances it may be desirable to add more heat to the solvent being re-circulated through the process, i. e., enroute from the solvent heater or stoppage tank 46, through the line 5 to the dissolving step of the process. For this purpose a by-pass line 58 is provided as shown in Fig. 1, through which the highly heated material from the pipe still heater 18 flowing through line 21 may be diverted under control of a valve 59 in line 58 to the line 5. By controlling the amount of the highly heated material so introduced into the line 5, the temperature of the mixed materials in this line may be accurately predetermined.

In order to prevent carbonization in the pipe still heater 18 and in the vaporizing chamber 22, it may in some instances be desirable to admit steam to mix with the materials flowing through the line 15 to the pipe still heater. For this purpose a line 60 from a suitable source of steam (not shown) is provided, which may be used for admitting an adjustably variable amount of steam to the line 15 under control of a valve 61 in the line 60.

*Treatment of the heavier specific gravity portion separated by specific gravity separation*

Referring now to the form of the invention shown in Figure 1, the heavier specific gravity portion which is separated from the liquid constituents, the flow of which has been traced in the previous section, by the apparatus generally designated as at 14, passes thence through the line diagrammatically indicated at 16 to apparatus by which the petroleum products or hydrocarbons still included therewith may be separated therefrom. I contemplate that this separation may be either and preferably by both of two ways, first, by vaporization of volatile constituents and second, by admixing the solid materials with a large amount of water and then separating the oil-soluble portions from the inorganic portions by decantation. In the diagrammatic illustration shown in Fig. 1, both these means or process steps are shown in the sequence hereinabove given.

For effecting a vaporization separation, the materials passing through the line 16 are first heated to a desired high temperature such that most, if not all, of the hydrocarbon material therein may be volatilized. For effecting this heating, it is contemplated that heat may be applied to to the higher specific gravity separated portion resulting from the specific gravity separation aforesaid in the apparatus generally indicated at 14, such application of heat being contemplated by any suitable means, including external or muffled heating, or internal or direct heating as by the admixture with this material of any highly heated fluid.

In the present instance, I have chosen to show internal heating, using as a heating fluid products of combustion generated especially for this purpose in a generator generally indicated at 62. The construction of this generator may be of any known or desired type. Any desired fuel may be used therein, which can be burned to produce highly heated products of combustion. I prefer, however, to use gas supplied to the generator 62 through a line 63, which is mixed and burned with air supplied to the generator through a line 64. Pressure within the generator may be maintained at any desired point by suitable means (not shown), so that products of combustion issue from the generator through a line 65, to join the material passing through the line 16 as shown. This mixed material flows together through a substantial distance in the line 16 to a gas or vapor separator 66.

In this separator any pressure which may exist in the line 16 and which may be retained therein under control of a valve 67 adjacent to the point where this line enters the separator 66 may be released, so as to maintain in the separator 66 a relatively low, preferably substantially atmospheric pressure. Vapor and gaseous constituents which separate from a substantially solid residue in the separator 66 may pass therefrom through a line 68, thence through a condenser generally indicated at 69, wherein the products may be cooled to condense the normally liquid portions thereof and thence to a second separator 70, wherein the condensed and now liquefied portions are separated from the gaseous portions.

The gaseous portions pass from the separator 70 through a line 71 to any suitable exhaust point such as a stack. Liquid portions pass therefrom through a line 72 to a suitable point in the process previously described, which in the present instance is the line 5, through which solvent is returned to the dissolving step of the process. Thus liquid supplied to the line 5 will be passed again through the process and valuable products thereof recovered.

Non-volatile material or residue passes from the lower end of the vapor separator 66, through an inner pipe 73 through which it is caused to move by the provision therein of a helical screw conveyor 74, which is secured to a center shaft, carrying outside the pipe 73 a toothed wheel 75, which may be driven by any suitable source of power (not shown). Surrounding the pipe 73 is an outer pipe 76 to form therebetween a jacket and thereby to provide a heat interchanger at this step of the process, so as to recover as much as possible of the heat from the solid materials passing through the pipe 73. While it is contemplated that this heat might be utilized at any desired portion of the process above described, I have shown it as being used to supply heat to the solvent being returned to the dissolving step of the process. For this purpose, the line 77 is provided from the line 5 to the annular jacket portion between the pipes 73 and 76 and a return pipe 78 is provided from this annular space back to the line 5. Flow through the jacket between the pipes 73 and 76 is controlled by a valve 79 in the line 77 and a valve 80 in the line 5 between the connections of this line with lines 77 and 78.

The solid material which has been moved from left to right as seen in Fig. 1, through the inner pipe 73 by the helical screw conveyor 74 passes from this pipe through a pipe 81 and may be discharged for any desired use as a final product at this point or may be subjected as shown in the drawings, to a further separation step for separating the inorganic materials from any organic materials remaining therein which will float on water. This step comprises the mixing of the materials with a substantial amount of water and then separating the oily materials, which will float thereon, from the solid materials which will sink to the bottom, this separation being effected by decantation.

For carrying out this purpose, there is provided a settling tank apparatus generally indicated at 82. A desired amount of water may be admixed with the materials flowing through the pipe 81 from a water line 83 under control of a suitable valve 84 therein. The settling tank apparatus may take the form shown or any other suitable form for effecting this purpose. As shown, however, this tank includes outlets at different levels as shown at 85 and 86 for the higher and lower levels, respectively. These outlets comprise pipes having valves 87 and 88 therein, respectively, so that the oil-water interface is kept at a level between these two outlets, excess oily material being run off through the pipe 85 and excess water through the pipe 86. Solid inorganic materials, which sink to the bottom, may be moved to a desired outlet pipe 89 by an endless conveyor 90, which is trained around sprockets 91 and 92, one of which may be suitably driven. Material passing out through the pipe 89 may be controlled by a suitable valve mechanism 93 therein and may be disposed of in any suitable way, including such uses for which it may be suited.

Combination of above described process with cracking

In Fig. 2 of the drawings, there is shown a diagrammatic illustration of apparatus for carrying out a combined process, including not only the process hereinabove set forth, but also the cracking of a cracking stock produced by the process as previously described and wherein certain other combination features are used for effecting a joint result.

The process generally includes most of the basic features of that process previously described in connection with Fig. 1 and employs many and substantially all the same elements, which are given the same reference characters in order to bring out this similarity. It may be desired, however, to combine this process with one for cracking a cracking stock, which in the usual instance, is or may be substantially the same as the gas oil fraction previously described, and which fraction is preferably used in part for re-circulation as the source of solvent for the dissolving of the soluble portion of the original raw material. As shown, some of the gas oil or cracking stock is diverted from the line 5 through a line 94 under control of a valve 95 and then passes to a cracking still 96, which may be the same as or similar to the pipe still heater 18. From this cracking still the products pass through a line 97 to a reaction chamber 98, in which the pressure is preferably somewhat less than that at which the material flows into the cracking still 96, so that there will be a separation therein between volatile constituents and non-volatile material. It is contemplated in accordance with this invention that either liquid or vapor phase cracking may be carried out, or any combination therebetween, this being effected by pressure and temperature control in any suitable way, for example, by the provision of suitable valves as shown at 99 and 100 in the line 97. The temperature to which the materials in the cracking still 96 are raised is contemplated to be in the range of about 850° F. to 1050° F. and preferably about 975° F.

Vapor from the reaction chamber 98, which acts as a vaporizing chamber and/or vapor separator, may pass through a line 101 under control of a valve 102 therein to a fractionating tower 103, which may be essentially the same as the fractionating tower 30 above described. In the tower 103, the vapor is subdivided by fractional condensation in the usual manner into selected fractions having different specific gravities as is now well known in the art. These fractions may include a gaseous fraction passing out of the top of the fractionating tower 103 through a line 104, a gasoline fraction passing out the upper portion through a line 105, a gas oil or re-cycle cracking stock fraction passing through a line 106, and one or more heavier fractions, which may pass out through other lines as shown at 107 and 108, the latter being heavy tarry material. These materials may be final products of the process as above described for the products drawn from the fractionating tower 30. Thus the material from the line 105 may all pass out this line through a suitable cooler (not shown) to a place where this material may be collected. Alternatively a portion thereof may pass through a line 109 to a storage and heating chamber, 110 similar to the chamber 46, to be re-circulated or re-cycled through the cracking process. The material for re-cycling is not desired to be cooled, as it must again be re-heated, so that it is withdrawn from the line or lines from the fractionating tower prior to the cooling of the materials passing through other portions of these lines. The amount of material withdrawn from the line 105, through line 109, is controlled by a valve 111 in the latter. A branch line 112 controlled by a valve 113 is provided for the flow of material from the line 106 to the line 109. Material from the storage or heating chamber 110 may pass thence through a line 114 under control of a valve 115 back to the line 94 leading to the cracking still 96, a suitable pump mechanism 116 being interposed in this line in order to insure desired flow of fluids therethrough. Heat for the material within the tank 110 may be derived in part at least, from materials flowing from the lower portions of the fractionating tower 103 as above described in connection with Fig. 1 and the tank 46. As shown, the line 107 leads to and through a heating coil within the tank 110 and thence out through a line 117 to a suitable delivery point. In this form of the invention there is also shown the line 40 from the vapor separator 38 passing to join the line 114, a suitable pump mechanism 118 being introduced therein to insure a desired flow of fluid in the path stated and a valve 119 being provided in this line for control of the flow.

In accordance with the usual practice, it is contemplated that several times as much material will be re-cycled through the cracking still and other apparatus just described in respect to the amount of material entering through the line 94 into the cracking portion of the process, so that there will be a two or three to one ratio between the re-cycled stock and the new material supplied for cracking.

Another tie in between the cracking portion of the process and that portion described in connection with Fig. 1, is in the treatment of the non-volatile materials separated from the vapor in the vaporizing chamber 22 and passing from the bottom of this chamber through the line 24. If desired, some of this material may be withdrawn from the process at this point through a line 120 under control of a valve 121 for such use as it is desired to put this material. However, some of this material, a selected part, may be supplied through a line 122 under control of a valve 123 to the line 97 between the cracking still 96 and the reaction chamber 98 and between the valves 99 and 100 in this line 97, as shown. This is termed "quench" in the art and serves to admix a portion of heavy materials from the first part of the process with the materials during their cracking or enroute to the cracking chamber. It serves to cool these materials to some extent and cause other desirable results, which will not be explained in detail herein as they form per se no part of the present invention.

Another feature, which is also old in the art, but which is diagrammatically disclosed herein, is the treatment of the non-volatile materials from the reaction chamber 98, which pass out through a line 124 from the bottom of this chamber and thence to a flash chamber 125, wherein the pressure is preferably maintained substantially less than the pressure within the reaction chamber 98. This subject matter was originally disclosed in my prior Patent No. 1,585,233, granted May 18, 1926, for Process for continuously distilling and cracking hydrocarbon oils. Flow of these materials through the line 124 is controlled by a suitable valve 126 therein. In the flash chamber 125, due to the substantial reduction in pressure therein, some of the materials supplied thereto will vaporize, the vapor passing off through a line 127 under control of a valve 128 to and through a cooler or heat interchanger 129, wherein the materials are substantially all liquefied and pass thence through a line 130 to join the line 114 or to some other selected part of the process. The relatively non-volatile material from the flash chamber 125 may pass through a line 131 from the lower end thereof, thence through a cooler or heat interchanger 132 to a desired collection point for this material, the flow being controlled by a suitable valve 133 interposed in this line.

There remains to describe merely the treatment of the heavier specific gravity portion separated from the lighter specific gravity portion in the separating apparatus 14 and passing therefrom through the line 16 under control of a valve 134 in this line. This material is preferably treated substantially the same as the similar material in the Fig. 1 form of the process, the apparatus being given the same reference characters as far as they are applicable to corresponding elements. The description of this apparatus will not be repeated herein, except to point out differences. Substantially the only difference is in the treatment of the condensation material from the vapor separator 70, which in this case passes through the line 72 to rejoin the re-cycle cracking stock passing through the line 114 as shown.

While I have shown and described but one basic process for carrying out the separation and recovery of valuable materials from rock asphalt, oil shales and like material and certain optionally usable variants thereof, including a means for cracking portions of the resultant materials, I contemplate that further variants may be devised and employed as will be apparent to those skilled in the art. I do not wish to be limited, therefore, except by the scope of the appended claim, which is to be construed validly as broadly as the state of the prior art permits.

What I claim is:

The process of treating rock asphalt, oil shales and like material containing both oil-soluble hydrocarbon and oil-insoluble inorganic portions to recover valuable petroleum products therefrom, which comprises the steps of comminuting such material until a major portion thereof is in a size range of about 30 to 40 mesh, mixing the comminuted material with a solvent to dissolve the oil-soluble portion thereof, said solvent being obtained from a subsequent step of the process, maintaining the temperature of the materials during solution in the order of magnitude of about 350° F., separating most of the oil-insoluble inorganic material from the solution of the oil-soluble portion by a continuous centrifuging operation based upon specific gravity difference while maintaining the entire body of such material and the solvent in a temperature in the order of magnitude of about 350° F., so as to control the viscosity of the liquid portion thereof and to yield a separated liquid portion having not over 5% of the inorganic material remaining therein and a complementary separated portion containing most of the inorganic material, passing this separated liquid portion to a pipe still heater and there heating it to a temperature in the order of magnitude of about 850° F., by-passing a selected portion of this separated liquid material around the pipe still heater and again mixing it with the material passing therethrough to control the temperature of the liquid material as re-mixed, passing this material as re-mixed into a vaporizing chamber and there effecting a vaporization separation of remaining inorganic material and non-volatile material from the vapor, passing the vapor from the vaporization chamber to a fractionating tower and therein effecting a fractional condensation separation of the vapor into desired fractions including a gaseous fraction, at least one fraction of the type of naphtha and straight run gasoline, a gas oil fraction and at least one heavier fraction, reheating a selected portion of said gas oil fraction by heat derived from at least one of said heavier fractions to provide a source of heated solvent oil, returning this heated solvent oil for use as a solvent for additional comminuted material as aforesaid, heating said complementary separated portion to a temperature sufficient to vaporize most of the volatile constituents thereof by introducing thereinto products of combustion generated for the purpose, effecting a vaporization separation between the non-volatile residue including the major part of the inorganic material and the gases and vapor thus produced, condensing normally liquid hydrocarbon constituents from this vapor, returning such condensed hydrocarbon constituents to mix with said solvent en route to the dissolving step aforesaid, and effecting a further separation between the major part of the inorganic material in said residue and any hydrocarbon material remaining therewith by treating the residue with water and decanting off separated hydrocarbon material therefrom.

JOHN W. COAST.

REFERENCES CITED

The following references are of record in the file of this patent:

UNITED STATES PATENTS

| Number | Name | Date |
|---|---|---|
| 1,327,572 | Ryan | Jan. 6, 1920 |
| 1,357,278 | Day | Nov. 2, 1920 |
| 1,490,213 | Jenson | Apr. 15, 1924 |
| 1,607,977 | Armstrong | Nov. 23, 1926 |
| 1,778,515 | Hampton | Oct. 14, 1930 |
| 1,868,737 | Egloff | July 26, 1932 |
| 1,903,749 | Carter | Apr. 11, 1933 |
| 1,934,028 | Asbury | Nov. 7, 1933 |
| 2,132,441 | Rosenthal | Oct. 11, 1938 |
| 2,328,325 | Butikofer | Aug. 31, 1943 |
| 2,431,677 | Brown | Dec. 2, 1947 |